Figure 1:
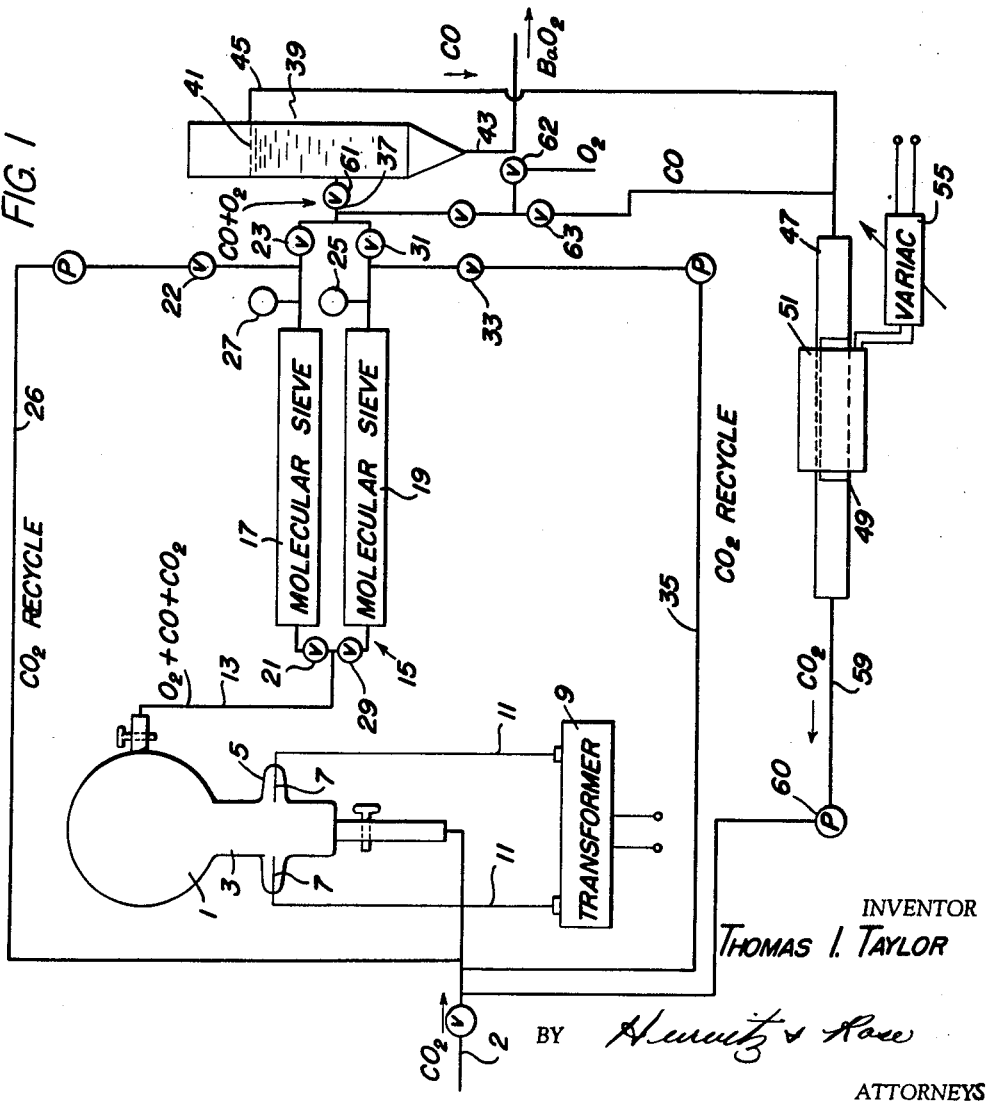

Dec. 3, 1963 T. I. TAYLOR 3,113,086
PRODUCTION OF $O_2$ FROM $CO_2$ BY ELECTRIC ARC OR RADIANT ENERGY
Filed Jan. 29, 1959

INVENTOR
THOMAS I. TAYLOR
BY Horwitz & Rose
ATTORNEYS

United States Patent Office 3,113,086
Patented Dec. 3, 1963

3,113,086
PRODUCTION OF $O_2$ FROM $CO_2$ BY ELECTRIC ARC OR RADIANT ENERGY
Thomas Ivan Taylor, Leonia, N.J., assignor to Isomet Corporation, Palisades Park, N.J., a corporation of New Jersey
Filed Jan. 29, 1959, Ser. No. 789,998
4 Claims. (Cl. 204—164)

This invention relates to a cyclic process for treating carbon dioxide to produce $O_2$. It has particular application in treating $CO_2$ that accumulates as a result of animal respiration in an enclosure, for example, in the interior of a submarine or a space vehicle.

When a submarine is submerged or a manner space vehicle is in flight, its occupants depend on oxygen tanks for their supply of oxygen. With each respiration a quantity of oxygen is removed from the atmosphere, and a quantity of $CO_2$ is added. Unless fresh oxygen is supplied, and excess $CO_2$ removed, the atmosphere of the vehicle soon becomes incapable of supporting life. The present invention provides a method of reacting the undesired $CO_2$ to produce $O_2$, thus removing $CO_2$ concurrently with conversion of $CO_2$ to $O_2$, and thereby concurrently effecting two kinds of revitalization of exhausted air.

It is an object of the present invention to provide a cyclic process for the conversion of $CO_2$ to C and $O_2$.

It is also an object of the present invention to provide a cyclic process for removing $CO_2$ gas from a confined space and replacing same by $O_2$ by converting the $CO_2$ into C and $O_2$.

It is a further object of the present invention to provide a process for converting $CO_2$ to C and $O_2$, which utilizes a radiant energy to convert gaseous $CO_2$ to CO and $O_2$ and which utilizes a catalyst for converting CO to $CO_2$ and C, which $CO_2$ is then recycled to the radiant energy treatment step.

It is another object of the invention to provide a process for converting gaseous $CO_2$ to $O_2$ and C by (1) converting the $CO_2$ to CO and $O_2$ in an electric arc, (2) separating the CO from the $O_2$, (3) converting the CO to C and $CO_2$, (4) separating the C and $CO_2$, and (5) resupplying the $CO_2$ to the electric arc for further conversion to CO and $O_2$.

Other and more detailed objects, features and advantages of the present invention will become apparent upon consideration of the following description, claims and drawings, wherein:

The single FIGURE is a flow diagram of a process according to the present invention.

Briefly describing a preferred embodiment of the present invention, a stream of $CO_2$ containing gas is subjected to the action of radiant energy, e.g. electric discharge, short ultra-violet rays or nuclear radiation, and preferably to electric discharge, which converts the $CO_2$ to CO and $O_2$. The gas mixture resulting from the reaction is then passed through a gas separation system, which preferentially separates $O_2$, CO and $CO_2$ from each other. The gas stream containing the CO is converted to C in powder form and $CO_2$ by means of a catalyst. The carbon powder is separated out and the gas mixture containing $CO_2$ is recycled to the radiant energy treatment step. The $O_2$ picked up by the separation system preferably is combined with a solid. The latter is readily removed from the system and the $O_2$ regenerated in any suitable manner and returned to the atmosphere. The separated carbon may be recovered and pressed into bricks or pellets. The net result is the conversion of $CO_2$ to C and $O_2$.

In one aspect of the present invention an electric discharge tube producing an arc is used in converting $CO_2$ to CO and $O_2$. Furthermore, the electrodes in the electrical discharge tube may be of suitable metal to support the spark without oxidation, preferably of platinum or nickel.

A magnetic field may be located adjacent the arc to increase the yield of $O_2$. The yield of $O_2$ may also be increased by using dry $CO_2$ gas.

The CO and $O_2$ produced in the discharge tube in the vicinity of the arc tend to recombine to form $CO_2$. It is therefore advantageous to cool the gases above the arc quickly. This is accomplished by the rapid removal of the gases from above the arc by means of a circulation pump, or by leaving the flow path immediately above the arc unimpeded. A cool surface of inactive material above the arc, against which the gases leaving the arc may impinge, may also serve to cool the gases.

The $O_2$ formed in the electric discharge tube is removed from the system before the gases are again recycled to the electric discharge tube. For this purpose any of a large number of agents may be used to take up the oxygen. Thus, for example BaO, complex cobalt compounds, e.g., cobalt chelates. Alternatively the so-called "molecular sieve," or other similar absorbent may be used in the well known chromatographic separation methods.

Among the complex cobalt compounds may be mentioned the cobalt chelates capable of carrying oxygen (see Bailor-Chemistry of the Coordination Compounds, 1956, pages 45 to 47, and the articles by Calvin et al. in the Journal of The American Chemical Society, vol. 68, pages 2254 to 2256, 2257 to 2262, 2263 to 2266, 2267 to 2273, 2273 to 2278 and 2612 to 2618.

In accordance with the present invention the CO formed in the electric discharge tube is converted into $CO_2$ and C, the $CO_2$ being recycled to the electric discharge tube. To effect this conversion a suitable catalyst is employed such as Ni, Co. Fe, Pt or the like or catalysts containing the same. The conversion of CO to C and $CO_2$ may be effected over a relatively wide temperature range which will vary with the catalyst and other process conditions such as pressure or presence of water vapor. However, best results may be obtained in the temperature range of about 350°–450° C.

The rate of flow of gases through the system may vary considerably according to the size of the installation, and the reaction condition. By way of example, flow rates of 200 cc./min. or 1000 cc./min. in laboratory equipment were found operative, the greater yield of $O_2$ per minute being obtained at the upper end of the range.

Since the system is to be operated continuously there is no time limit on the reactants. However, there is a time lag between the starting of the operation and the point of maximum rate of $O_2$ produced.

Referring to the drawing, which shows a schematic representation of an illustrative embodiment of the present invention, the system comprises four sections; (I) the $CO_2$ decomposition section; (II) the residual $CO_2$ removal section; (III) the $O_2$ absorption section, and (IV) the CO conversion section.

Section I comprises a two liter flask 1 having a long neck which has an outer diameter of about 40 mm. Approximately midway down neck 3 is discharge tube 5, whose interior is continuous with the interior of neck 3. Each end of discharge tube 5 is provided with an electrode 7. In the apparatus illustrated the electrodes are of platinum and the discharge tube has an outside diameter of 18 mm., the spark gap between the electrodes being about 2 cm. The platinum electrode may be replaced with a nickel electrode, or any other electrode may be employed which is capable of producing and maintaining an electrical arc over a considerable period. The electrodes are connected to transformer 9, by means of electrical leads 11. The transformer employed may be of 100–300 watt capacity and 12,000 to 15,000 volts output.

In operation, $CO_2$ gas is introduced into flask 1 through line 2. The $CO_2$ may be obtained by the vaporization of Dry Ice, although any other suitable $CO_2$ source may be used. If wet, the $CO_2$ gas is dried, by any suitable and conventional means, before it enters flask 1. Current is then turned on and an arc is developed between the electrodes. The $CO_2$ gas traversing the arc is partially converted into CO and $O_2$ in accordance with the equation $$2CO_2 + arc \rightarrow 2CO + O_2$$

The product gases together with unconverted $CO_2$ are rapidly led away from the arc and out of flask 1 to section II. This is effected by the pumping system.

Section I of the system is joined to section II of the system by means of conduit 13. Section II is designed to remove residual $CO_2$ from the system preliminary to removing $O_2$ from the system. For this purpose is provided a tubular system 15 having two branches 17 and 19, each provided with "molecular sieves," i.e., zeolite type absorbents. In place of the "molecular sieves" other $CO_2$ absorbents such as silicagel or carbon may be used.

The gases entering section II by means of line 13 are $O_2$, CO and residual $CO_2$. For some purposes, it is advantageous to remove the residual $CO_2$ first. The mixture of gases are passed through, for example, line 15 of section II while valves 21 and 23 are closed. $CO_2$ is strongly absorbed by "molecular sieve" and CO is next strongly absorbed, whereas $O_2$ passes through readily. The gases are passed through the arm 19 until gauge 25 indicates that $CO_2$ is starting to come through. The valving is then switched so that valves 21 and 23 are open and valves 29 and 31 are closed. The gases are thereby directed through arm 17. The material in arm 19 is then heated to drive off the $CO_2$. During this operation valve 33 is left open and the $CO_2$ evolved is recycled by line 35 to the $CO_2$ feed line 2. Similarly, when gauge 27 begins to indicate that $CO_2$ is starting to come through, valves 21 and 23 are closed and valve 22 is opened. Arm 17 is then heated to drive off the $CO_2$, which is then recycled by means of line 26 to feed line 2.

Section II of the system is joined to section III of the system by means of conduit 37, which carries a mixture of CO and $O_2$ to $O_2$ absorbing chamber 39. Maintained in chamber 39 is a bed of BaO 41 which permits the gases to pass therethrough. The $O_2$ rising through chamber 39 reacts with BaO in accordance with the equation $$2BaO + O_2 \rightarrow 2BaO_2$$

The $BaO_2$ is removed from the bottom of chamber 39 by means of line 43 and may be regenerated into oxygen in a suitable manner. The CO rising in chamber 39 leaves the chamber by means of line 45. In place of the BaO bed other $O_2$ absorbers may be employed. Notable among these are the cobalt chelates, such as cobalt salicylaldehyde ethylenediimine and the like.

Section II of the system is designed to remove $CO_2$ from the system prior to $O_2$ removal. This is usually preferable since it has been found that with certain $O_2$ absorbents the presence of $CO_2$ in the gas stream interferes with $O_2$ absorption by these absorbents. However, where absorbents are employed such that the presence of $CO_2$ is not disadvantageous section II might be dispensed with, and the gases issuing from section I may be led directly to $O_2$ absorption section III.

Alternatively, section III may be dispensed with if an absorbent such as "molecular sieve" absorbent in Section II is operated at a low temperature. In this case, the gases come through conduit 17 in the order $O_2$, CO and $CO_2$. With valves 61 and 63 closed, $O_2$ may be drawn off through valve 62. When the meter 27 indicates that CO has started to come through the absorbent, valve 62 is closed and valve 63 is opened. Then when $CO_2$ starts to come through 19 is used, valve 22 is opened, valve 23 and 63 are closed and 17 is heated to drive off the $CO_2$. This cycle is then repeated while the gases come through 19.

The gas stream leaving chamber 39 by line 45 is rich in CO. It is a feature of this invention to convert this CO to $CO_2$, which can be reprocessed to produce additional $O_2$. To this end, the gas stream containing the CO is conveyed to section IV of the system, comprising a quartz tube 47 having an outside diameter of 30 mm., containing nickel screen material 49, which serves as a catalyst. About the center of tube 47 is an electrical furnace 51, which may be regulated by the voltage varying means 55. The temperature is maintained at between 300 to 350° C. However, it may be operated in a wider temperature range of from 300 to 450° C. During the reaction carbon collects in the tube. When the carbon deposits become extreme a fresh tube containing nickel screen catalyst is inserted in the system.

The reaction that takes place in section IV may be expressed by the equation:

$$\mathrm{CO} \xrightarrow[\text{heat}]{\text{catalyst}} CO_2 + C$$

The $CO_2$ produced in this reaction is recycled through line 59 by means of pump 60 to $CO_2$ feed line 2, thus completing the cycle.

Using the apparatus described above and the conditions set forth therein the following runs were made:

| Sample | Flow rate of $CO_2$, cc./min. | Time, min. | Percent $O_2$ |
|---|---|---|---|
| 1 | 200 | 40 | 2.3 |
| 2 | 200 | 60 | 2.4 |
| 3 | 200 | 60 | 2.5 |
| 4 | 1,000 | 40 | 1.34 |
| 5 | 1,000 | 60 | 1.43 |
| 6 | 1,000 | 60 | 1.44 |

The approximate rate of production of $O_2$ under flow conditions of about 200 to 250 cc./min. is 5 to 6.3 cc./min. and for a flow rate of about 1000 cc./min., 14 cc./min.

While I have described and illustrated the present invention as employed in a preferred embodiment utilizing an electric arc, the latter may be replaced by a source of strong ultra-violet electromagnetic wave energy, with wave length shorter than 1700 A. Where the invention is employed in a submarine the electric arc presents the most practicable and suitable device for decomposing $CO_2$, whereas in a space vehicle, electrical power is not generally available in excess of requirements, whereas abundant ultra-violet radiation is available, and is therefore employed. Nuclear radiations may also be used for decomposing the $CO_2$ for special purposes.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What is claimed is:

1. Process for the conversion of $CO_2$ to $O_2$ which comprises the steps of passing a $CO_2$ containing gas through an electric discharge to dissociate the $CO_2$ into CO and $O_2$, rapidly removing and cooling the mixture of CO, $O_2$ and undissociated $CO_2$ thus formed, removing $CO_2$ from the mixture by passing the mixture through a solid absorbent for the $CO_2$, passing the resulting mixture of CO and $O_2$ through a solid absorbent for the $O_2$, contacting the CO with a metal catalyst of group VIII of the periodic system at an elevated temperature to transform the CO into free carbon and $CO_2$, regenerating the $CO_2$ from its absorbent, recycling all the $CO_2$ to the electric discharge treatment step, and recovering the $O_2$ from its absorbent.

2. The process of claim 1 in which the absorbent for the $CO_2$ is a zeolite bed.

3. The process of claim 1 in which the electric discharge is an electric arc.

4. Process for the conversion of $CO_2$ to $O_2$ which comprises the steps of passing a $CO_2$ containing gas through an electric discharge to dissociate the $CO_2$ into CO and $O_2$, rapidly removing and cooling the mixture of CO, $O_2$ and undissociated $CO_2$ thus formed, removing $O_2$ from the mixture by passing the mixture through a solid absorbent for the $O_2$, passing the resulting mixture of CO and $CO_2$ in contact with a metal catalyst of group VIII of the periodic system at an elevated temperature to transform the CO into free carbon and $CO_2$, recycling all the $CO_2$ to the electric discharge treatment step, and recovering the $O_2$ from its absorbent.

References Cited in the file of this patent

UNITED STATES PATENTS

| 1,497,173 | Hechenbleikner | June 10, 1924 |
| 2,799,640 | Pevere et al. | July 16, 1957 |

FOREIGN PATENTS

| 286,845 | Great Britain | Mar. 15, 1928 |

OTHER REFERENCES

J. Amn. Chem. Soc., vol. 47 (1925), pp. 2682, 2684 and 2690. (Copy in Div. 6.)

J. Chem. Soc., page 133 (1948).

Ellis et al.: The Chemical Action of Ultraviolet Rays, pp. 45, 307 and 308 (1941). (Copy in Div. 56.)

Glockler et al.: The Electrochemistry of Gases and Other Dielectrics, pp. 233–238 (1939). (Copy in Div. 56.)